United States Patent
Tanaka et al.

(10) Patent No.: US 10,099,415 B2
(45) Date of Patent: Oct. 16, 2018

(54) INJECTION MOLDING MACHINE

(71) Applicant: FANUC Corporation, Yamanashi (JP)

(72) Inventors: Kazuyoshi Tanaka, Yamanashi (JP); Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/089,802

(22) Filed: Apr. 4, 2016

(65) Prior Publication Data

US 2016/0288393 A1    Oct. 6, 2016

(30) Foreign Application Priority Data

Apr. 6, 2015 (JP) .................... 2015-077402

(51) Int. Cl.
| | |
|---|---|
| B29C 45/84 | (2006.01) |
| B29C 45/77 | (2006.01) |
| B29C 45/64 | (2006.01) |
| B29L 31/00 | (2006.01) |

(52) U.S. Cl.
CPC .............. *B29C 45/77* (2013.01); *B29C 45/84* (2013.01); *B29C 45/64* (2013.01); *B29L 2031/757* (2013.01)

(58) Field of Classification Search
CPC ...................................... B29C 45/84
See application file for complete search history.

(56) References Cited

U.S. PATENT DOCUMENTS

| | | | |
|---|---|---|---|
| 2004/0075183 A1 | 4/2004 | Matsubayashi et al. | |
| 2005/0220918 A1* | 10/2005 | Wakabayashi | B29C 45/84 425/136 |
| 2009/0065973 A1* | 3/2009 | Jung | B29C 45/045 264/254 |
| 2012/0306112 A1 | 12/2012 | Tokuyama et al. | |
| 2014/0370139 A1 | 12/2014 | Horiuchi | |
| 2016/0243741 A1* | 8/2016 | Uchiyama | B29C 45/7666 |

FOREIGN PATENT DOCUMENTS

| | | |
|---|---|---|
| CN | 102806627 A | 12/2012 |
| CN | 203092998 U | 7/2013 |
| JP | S5167577 A | 6/1976 |
| JP | 4-4117 A | 1/1992 |
| JP | H06-114909 A | 4/1994 |
| JP | H06-339959 A | 12/1994 |
| JP | H07-186232 A | 7/1995 |

(Continued)

OTHER PUBLICATIONS

Electronic translation of JP 06-114909. retrived May 9, 2018.*

(Continued)

*Primary Examiner* — Jill L Heitbrink
(74) *Attorney, Agent, or Firm* — Hauptman Ham, LLP

(57) ABSTRACT

In an injection molding machine, a locking mechanism of a safety cover of the injection molding machine is operated to be in a locked state in a case where injection pressure inside an injection device is equal to or higher than a predetermined value. Accordingly, a maintenance work of the injection molding machine can be performed only in a state in which pressure inside an injection cylinder is sufficiently lowered, so that a risk of jetting of resin is lowered and safety of an operator can be secured.

6 Claims, 4 Drawing Sheets

(56) References Cited

FOREIGN PATENT DOCUMENTS

| JP | 2000-280312 A | | 10/2000 | |
|----|---------------|---|---------|---|
| JP | 2003-080358 A | | 3/2003 | |
| JP | 2004-090541 A | | 3/2004 | |
| JP | 2006-007466 A | | 1/2006 | |
| JP | 2013-188875 A | | 9/2013 | |
| JP | 2013188875 A | * | 9/2013 | ............ B29C 45/76 |
| JP | 2014-028491 A | | 2/2014 | |
| JP | 2015-000482 A | | 1/2015 | |

OTHER PUBLICATIONS

Office Action dated Aug. 9, 2016 in Japanese Application No. 2015-077402.
Office Action for Chinese Application No. 201610210248.X, dated Sep. 22, 2017; 12 pages.

* cited by examiner

INJECTION MOLDING MACHINE

RELATED APPLICATIONS

The present application claims priority to Japanese Patent Application Number 2015-077402, filed Apr. 6, 2015, the disclosure of which is hereby incorporated by reference herein in its entirety.

BACKGROUND OF THE INVENTION

1. Field of the Invention

The present invention relates to an injection molding machine, and especially relates to an injection molding machine provided with a pressure monitoring device for the inside of the injection molding machine.

2. Description of the Related Art

In an injection device of an injection molding machine, resin which is melted at a high temperature is poured into a mold which is fixed to a platen so as to form a molded article. In an injection operation, highly-heated resin is injected at high speed and high pressure. The resin is extremely highly heated, so that the periphery of a nozzle from which the resin is jetted is mainly covered by a safety cover or the like for safety of an operator so as to secure safety.

A maintenance work is sometimes performed while opening a safety cover. At this time, safety is secured by disabling the injection molding machine. In addition to this disabling, it is necessary to pay sufficient attention to a highly-heated nozzle and a highly-heated member such as melted resin in the injection molding machine. Especially, when melted resin in the nozzle tip is cooled and solidified to clog a hole on the nozzle tip, the melted resin inside the nozzle is maintained in a high pressure state even in a state in which the injection molding machine is stopped. Then, when the solidified resin in the nozzle tip is melted again and the clogging is eliminated, the resin may jet out from the nozzle. Therefore, it is necessary to perform the maintenance work while constantly paying attention to the state of the nozzle and the state of the pressure inside a cylinder.

Further, in a state in which a nozzle is brought into contact with a mold, that is, in a nozzle touch state, melted resin may jet toward a mold clamping device from the nozzle through the mold.

In Japanese Patent Application Laid-Open No. 51-67577, a door switch for a door serving as a safety cover, a rotation detection mechanism which detects presence/absence of rotation of a motor inside an injection molding machine, and a door locking mechanism are provided as safety measures by a safety cover of the injection molding machine. When the door is opened, a power source is turned off so as not for the motor to rotationally drive. When the motor rotates, the door is locked by the door locking mechanism.

Japanese Patent Application Laid-Open No. 2013-188875 discloses a technique in which when opening of a safe door is detected by a safe door position detection switch, a nozzle is retracted so as not to generate a nozzle touch force and thus, safety of an operator is secured in a nozzle touch force control device of an injection molding machine.

Japanese Patent Application Laid-Open No. 2003-80358 discloses a technique in which a shield plate is inserted between a fixed mold and a movable mold in synchronization with an opening movement of a safe door of an injection molding machine so as to secure safety in taking out a metal molded article.

Japanese Patent Application Laid-Open No. 2014-28491 discloses a technique in which pressure is monitored and a screw is retracted when a safety cover is opened at time or after stop of a forward movement instruction of an injection device and before start of a retracting instruction in a state in which a nozzle is abutted on a nozzle touch unit in an injection molding machine.

In the techniques disclosed in Japanese Patent Application Laid-Open No. 51-67577, Japanese Patent Application Laid-Open No. 2013-188875, and Japanese Patent Application Laid-Open No. 2003-80358, rotation of the motor of the machine is stopped and resin inside is prevented from jetting out when the safety cover is opened. However, the pressure inside the nozzle is maintained at high pressure, so that when the clogging of the nozzle is eliminated, resin may jet out to expose an operator to dangers.

In the technique disclosed in Japanese Patent Application Laid-Open No. 51-67577, the locking mechanism for the safety cover is released in response to the stop of the rotation of the motor in the machine. Here, when the pressure inside the cylinder is high, resin may jet out when the safety cover is opened.

In the technique disclosed in Japanese Patent Application Laid-Open No. 2013-188875, the nozzle touch force is released when the safety cover is opened, but resin may jet out when the nozzle touch state is not generated.

In the technique disclosed in Japanese Patent Application Laid-Open No. 2003-80358, a safety cover covering a gate portion of the mold is merely provided, so that resin may jet out when a maintenance work around the gate portion is performed.

In the technique disclosed in Japanese Patent Application Laid-Open No. 2014-28491, a shaft needs to be operated in the safety cover opened state at which the operation should be stopped as a main body emergency stop state, so that an operator may be exposed to dangers. Further, the pressure is monitored only in the nozzle touch state, so that resin may jet out when the clogging of the nozzle is eliminated.

It is difficult to recognize a state in which a nozzle is clogged and a state in which the pressure inside a cylinder is high even by visually inspecting the nozzle and the cylinder, so that an operator may perform the maintenance work without recognizing a dangerous state in which resin jets out.

SUMMARY OF THE INVENTION

An object of the present invention is to provide an injection molding machine which enables a maintenance work thereof to be performed in such manner that a risk of jetting of resin is lowered and safety of an operator is secured.

An injection molding machine according to the present invention includes an injection device which includes at least one safety cover which is openable and closable and a screw, an injection pressure detection unit which detects injection pressure inside the injection device, a locking mechanism which prevents opening of the safety cover, and a lock control unit which controls the locking mechanism, in which the lock control unit sets the locking mechanism to a locked state so as to inhibit opening of the at least one safety cover in a case where injection pressure, which is detected by the injection pressure detection unit, inside the injection device is equal to or higher than a predetermined value.

Accordingly, the maintenance work of the injection molding machine can be performed only in a state in which pressure inside a cylinder is sufficiently lowered, so that safety of an operator can be secured.

A safety cover which is disposed in a direction in which the injection device injects resin may be included as the safety cover opening of which is inhibited in the case where injection pressure, which is detected by the injection pressure detection unit, inside the injection device is equal to or higher than a predetermined value.

Accordingly, opening especially of the safety cover which is disposed in a direction in which the injection device jets resin is inhibited, so that safety of an operator can be further secured.

An injection molding machine according to the present invention includes an injection device which includes at least one safety cover which is openable and closable, a screw, and a nozzle, an injection pressure detection unit which detects injection pressure inside the injection device, a locking mechanism which prevents opening of the safety cover, a nozzle touch detection unit which detects a contact state of the nozzle with respect to a mold, and a lock control unit which controls the locking mechanism, in which the lock control unit sets the locking mechanism to a locked state so as to inhibit opening of the safety cover in a case where the nozzle touch detection unit detects a contact state of the nozzle with respect to the mold and injection pressure, which is detected by the injection pressure detection unit, inside the injection device is equal to or higher than a predetermined value.

Pressure inside the cylinder is directly transmitted to resin inside the mold in the nozzle touch state, so that the resin may jet out to a mold opening/closing portion when the mold is opened. For the case, opening of the safety cover is inhibited so as to be able to further secure safety of an operator.

A danger notification unit which provides notification in a case where injection pressure, which is detected by the injection pressure detection unit, inside the injection device is equal to or higher than a predetermined value may be further provided.

Accordingly, notification is performed when injection pressure is equal to or higher than a predetermined value, so that an operator can easily grasp a state in which the pressure inside the injection device is high.

A screw retraction control unit which retracts the screw in a case where injection pressure, which is detected by the injection pressure detection unit, inside the injection device is equal to or higher than a predetermined value at time of an end of a molding operation of the injection device may be further provided.

Accordingly, the screw is retracted in a case where injection pressure inside the injection device is equal to or higher than a predetermined value so as to actively lower pressure inside the cylinder. Thus, an operator can be rendered safe in an early stage.

A safety cover opening operation detection unit which detects an action of trying to open the safety cover by an operator and a screw retraction control unit which retracts the screw when the safety cover opening operation detection unit detects the action of trying to open the safety cover by an operator in the case where injection pressure, which is detected by the injection pressure detection unit, inside the injection device is equal to or higher than a predetermined value may be further provided.

Accordingly, when an operator tries to open the safety cover in the case where injection pressure inside the injection device is equal to or higher than a predetermined value, the screw is retracted so as to actively lower the pressure inside the cylinder. Thus, it is possible to render the operator safe in an early stage.

According to the present invention, it is possible to provide an injection molding machine which enables a maintenance work thereof to be performed in such manner that a risk of jetting of resin is lowered and safety of an operator is secured.

BRIEF DESCRIPTION OF THE DRAWINGS

The above-described and other objects and features of the present invention will be apparent from the following description of embodiments in reference to the accompanying drawings. Among these drawings.

DETAILED DESCRIPTION OF THE PREFERRED EMBODIMENTS

Figure 1:
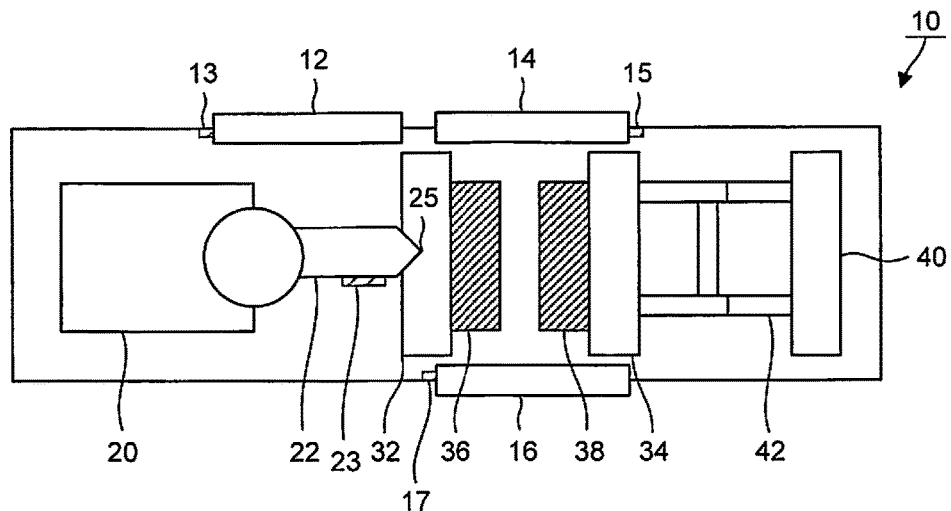
FIG. 1 is a schematic view illustrating an injection molding machine used in an embodiment of the present invention.

Embodiments of the present invention will be described below with reference to the accompanying drawings. FIG. 1 is a schematic view illustrating an injection molding machine used in an embodiment of the present invention. An injection device 20 includes an injection cylinder 22, a nozzle 25 which is provided to a tip of the injection cylinder 22, and an injection pressure detector 23 which detects injection pressure inside the injection cylinder 22. The injection device 20 further includes a nozzle touch detection unit, which is not illustrated, near the nozzle 25. Further, a fixed mold 36 is attached to a fixed platen 32.

A toggle mechanism 42 is attached to a rear platen 40, a movable platen 34 is attached to an end portion of the toggle mechanism 42, and a movable mold 38 is attached to the movable platen 34.

12, 14, and 16 denote safety covers of an injection molding machine 10 respectively. Further, 13, 15, and 17 denote locking mechanisms respectively provided to the safety covers 12, 14, and 16. These locking mechanisms 13, 15, and 17 are capable of setting respective safety covers 12, 14, and 16 to a locked state so that the safety covers 12, 14, and 16 cannot be opened and releasing the locked state to set the safety covers 12, 14, and 16 to an openable state.

The movable platen 34 and the movable mold 38 can be moved in a forward/backward direction (in a horizontal direction in FIG. 1) by the toggle mechanism 42. By the movement of the movable platen 34 and the movable mold 38 in the forward/backward direction, mold opening, mold closing, and mold clamping of the fixed mold 36 and the movable mold 38 are performed. The nozzle 25 can be brought into contact (nozzle touch) with the fixed mold 36. Melted resin is injected into the mold from the nozzle 25 after mold closing and then, mold clamping is performed so as to form a molded article.

Here, in the present embodiment, pressure inside the injection cylinder 22 is detected by the injection pressure detector 23. When a detected pressure value is larger than a predetermined pressure which is set in advance, the locking mechanisms (13, 15, 17) are operated so as to control such that the safety covers (12, 14, 16) cannot be opened.

Thus, when the pressure inside the injection cylinder 22 is higher than the predetermined pressure value, the safety covers (12, 14, 16) cannot be opened. Accordingly, safety of an operator can be secured.

Figure 4:
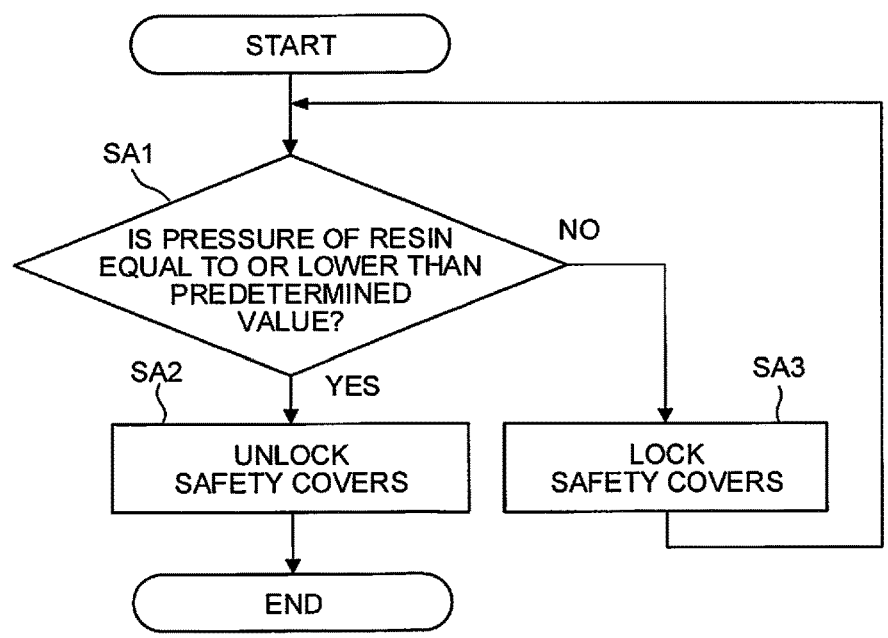
FIG. 4 is a flowchart illustrating a flow of an operation according to the embodiment of the present invention.

FIG. 4 is a flowchart illustrating a flow of an operation according to the present embodiment. The flow is described step by step below.

(Step SA1) Whether or not pressure inside the injection device is equal to or lower than a predetermined value is determined. When the pressure inside the injection device is equal to or lower than the predetermined value (YES), the process goes to step SA2. When the pressure inside the injection device is higher than the predetermined value (NO), the process goes to step SA3.

(Step SA2) The safety covers are unlocked and the process is ended.

(Step SA3) The safety covers are locked and the process returns to step SA1.

In the present embodiment, when the pressure inside the injection cylinder 22 is higher than the predetermined pressure value, all safety covers (12, 14, 16) are locked. As a modification, only part of the safety covers can be locked such that only the safety covers (14, 16) which are disposed close to a mold opening/closing portion are locked, for example.

Figure 2:
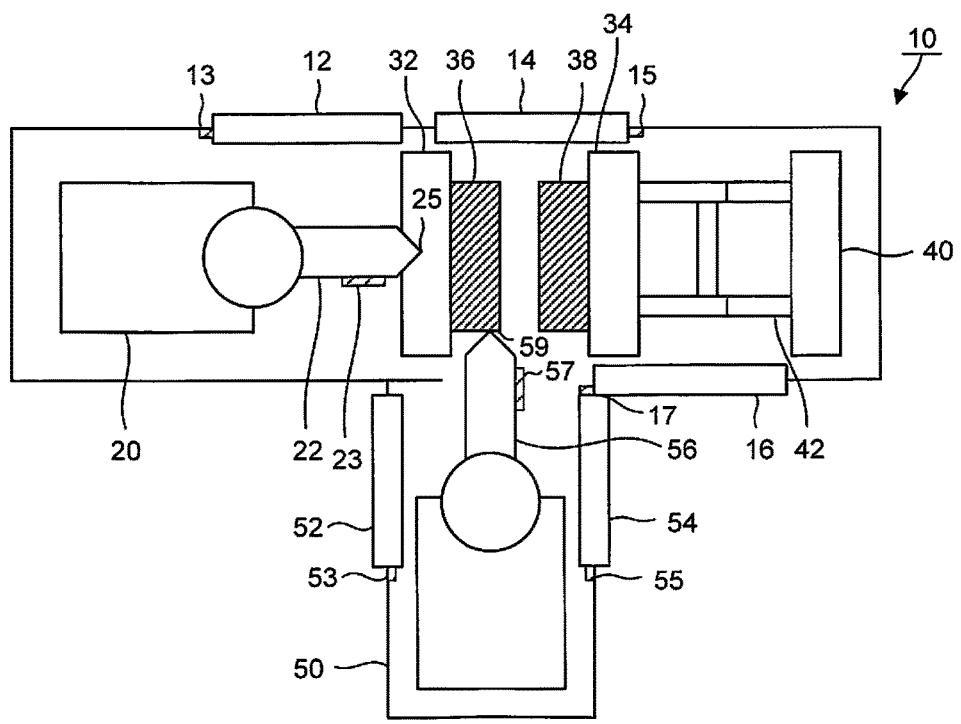
FIG. 2 is a schematic view illustrating an injection molding machine according to another embodiment of the present invention.

FIG. 2 is a schematic view illustrating an injection molding machine according to another embodiment. The injection molding machine 10 according to the present embodiment includes two injection devices which are used for two-color molding or the like. The injection molding machine 10 according to the present embodiment is different from the injection molding machine of the previous embodiment in that the injection molding machine 10 according to the present embodiment is provided with a second injection device 50 which is disposed in parallel with a contact surface (parting surface) between the fixed mold 36 and the movable mold 38. The function of the second injection device 50 is similar to that of the injection device of the previous embodiment except that the second injection device 50 is disposed in parallel with the contact surface between the fixed mold 36 and the movable mold 38, so that the description thereof is omitted. To the second injection device 50 as well, safety covers (52, 54) are provided. Further, the safety cover 14 is provided in the jetting direction of resin from a nozzle 59 of the second injection device 50 and thus, it can be said that the safety cover 14 serves as the safety cover of the second injection device 50 as well.

In the present embodiment as well, pressure inside the injection cylinder 22 is detected by the injection pressure detector 23 and pressure inside an injection cylinder 56 is detected by an injection pressure detector 57. When either detected pressure value is larger than predetermined pressure which is set in advance, locking mechanisms (13, 15, 17, 53, 55) are operated so as to control such that the safety covers (12, 14, 16, 52, 54) cannot be opened.

Thus, when the pressure inside the injection cylinder 22 is higher than the predetermined pressure value, the safety covers (12, 14, 16, 52, 54) cannot be opened. Accordingly, safety of an operator can be secured. The flow of the operation is similar to that in the flowchart illustrated in FIG. 4 of the previous embodiment, so that the description thereof is omitted.

In the present embodiment, when the pressure inside either one of the injection cylinders is higher than the predetermined pressure value, all safety covers (12, 14, 16, 52, 54) are locked. As a modification, only the safety covers (14, 16) which are disposed close to the mold opening/closing portion can be locked, for example. Further, as another method, when the injection pressure inside the injection device 20 is higher than the predetermined pressure value, only the safety covers (12, 14, 16) which are safety covers related to the injection device 20 can be locked. While, when the injection pressure inside the second injection device 50 is higher than the predetermined pressure value, only the safety covers (14, 52, 54) which are safety covers related to the second injection device 50 can be locked.

Figure 3:
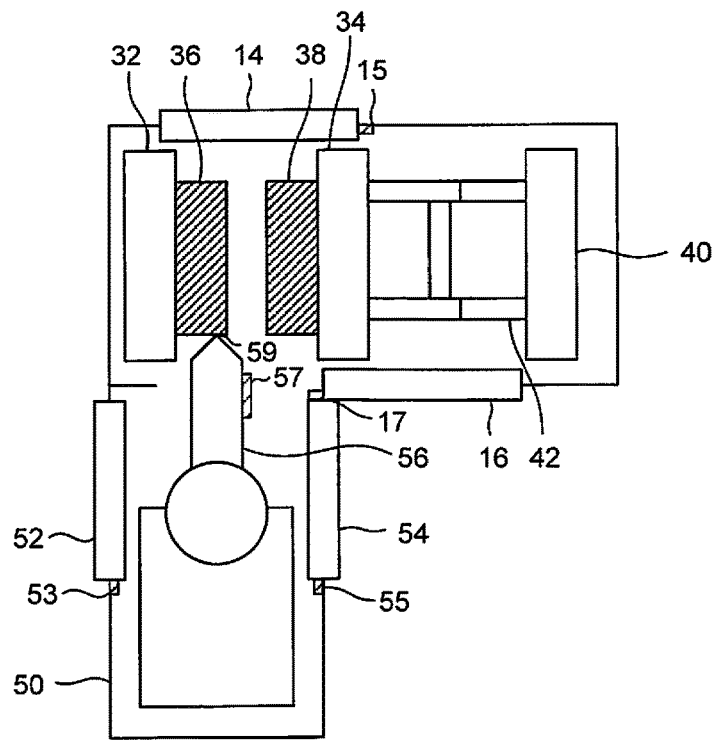
FIG. 3 is a schematic view illustrating an injection molding machine according to still another embodiment of the present invention.

FIG. 3 is a schematic view illustrating an injection molding machine according to still another embodiment. The injection molding machine 10 according to the present embodiment is different from the injection molding machines of the previous embodiments in that the injection molding machine 10 according to the present embodiment is provided only with the second injection device 50 which is disposed in parallel with the contact surface (parting surface) between the fixed mold 36 and the movable mold 38. The function of the second injection device 50 is similar to that of the injection device of the previous embodiment except that the second injection device 50 is disposed in parallel with the contact surface between the fixed mold 36 and the movable mold 38, so that the description thereof is omitted. To the second injection device 50 according to the present embodiment as well, safety covers (52, 54) are provided. Further, the safety cover 14 is provided in the jetting direction of resin from the nozzle 59 of the second injection device 50 and thus, it can be said that the safety cover 14 serves as the safety cover of the second injection device 50 as well.

In the present embodiment as well, the pressure inside the injection cylinder 56 is detected by the injection pressure detector 57. When a detected pressure value is larger than predetermined pressure which is set in advance, the locking mechanisms (15, 17, 53, 55) are operated so as to control such that the safety covers (14, 16, 52, 54) cannot be opened.

Thus, when the pressure inside the injection cylinder 56 is higher than the predetermined pressure value, the safety covers (14, 16, 52, 54) cannot be opened. Accordingly, safety of an operator can be secured. The flow of the operation is similar to that is the flowchart illustrated in FIG. 4 of the previous embodiment, so that the description thereof is omitted.

Figure 5:
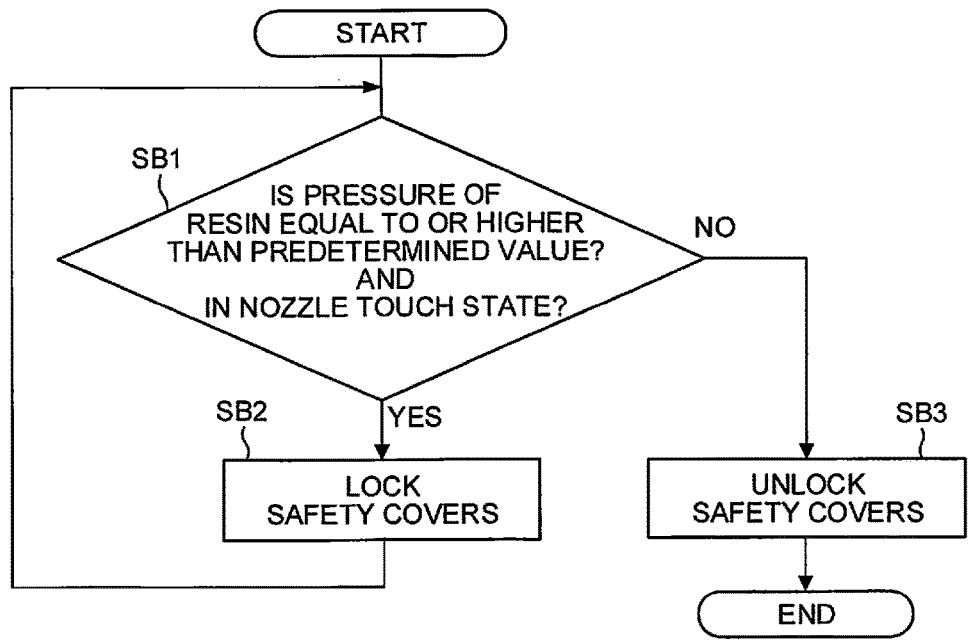
FIG. 5 is a flowchart illustrating a flow of an operation according to yet another embodiment of the present invention.

FIG. 5 is a flowchart illustrating a flow of an operation according to yet another embodiment. The flow is described step by step below.

(Step SB1) Whether or not pressure inside the injection device is equal to or higher than a predetermined value and the nozzle is brought into contact with (nozzle touch) the mold is determined. When both are satisfied (YES), the process goes to SB2. When either one is not satisfied (NO), the process goes to step SB3.

(Step SB2) The safety covers are locked and the process returns to step SB1.

(Step SB3) The safety covers are unlocked and the process is ended.

Especially, in a case where a hot runner mold is mounted, for example, melted resin stays inside the mold. Therefore, the pressure inside the cylinder is directly transmitted to resin inside the mold in the nozzle touch state and the resin may jet out toward the mold opening/closing portion when the mold is opened. For such case, when pressure of resin in the cylinder or the mold is equal to or higher than a predetermined value in the nozzle touch state, the safety covers are locked so as to be able to secure safety of an operator in the present embodiment.

Figure 6:
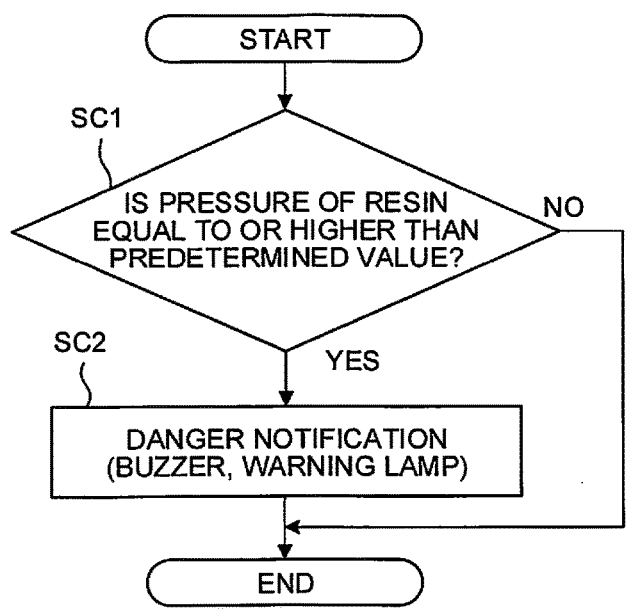
FIG. 6 is a flowchart illustrating an operation according to a modification of the present invention.

FIG. 6 is a flowchart illustrating a flow of an operation according to a modification of the present embodiment. The flow is described step by step below.

(Step SC1) Whether or not pressure inside the injection device is equal to or higher than a predetermined value is determined. When the pressure inside the injection device is equal to or higher than the predetermined value (YES), the process goes to step SC2. When the pressure inside the injection device is lower than the predetermined value (NO), the process is ended.

(Step SC2) Danger notification is performed by a buzzer or a warning lamp and the process is ended.

In the present modification, danger notification is performed by a buzzer or a warning lamp when the pressure inside the injection device is equal to or higher than the predetermined value, so that an operator can easily grasp a state in which the pressure inside the injection device is high.

Figure 7:
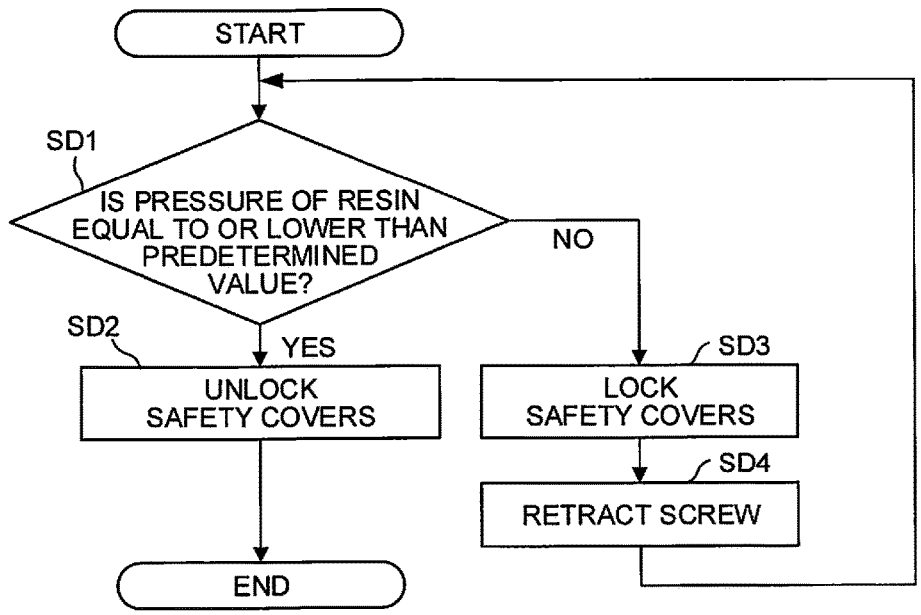
FIG. 7 is a flowchart illustrating an operation according to another modification of the present invention.

FIG. 7 is a flowchart illustrating a flow of an operation according to another modification of the present embodiment. The flow is described step by step below.

(Step SD1) Whether or not pressure inside the injection device is equal to or lower than a predetermined value is determined. When the pressure inside the injection device is equal to or lower than the predetermined value (YES), the process goes to step SD2. When the pressure inside the injection device is higher than the predetermined value (NO), the process goes to step SD3.

(Step SD2) The safety covers are unlocked and the process is ended.

(Step SD3) The safety covers are locked.

(Step SD4) The screw is retracted and the process returns to step SD1.

In the present modification, in the case where the injection pressure inside the injection device is equal to or higher than the predetermined value, the pressure inside the cylinder is actively lowered by retracting the screw so as to be able to render an operator safe in an early stage.

Figure 8:
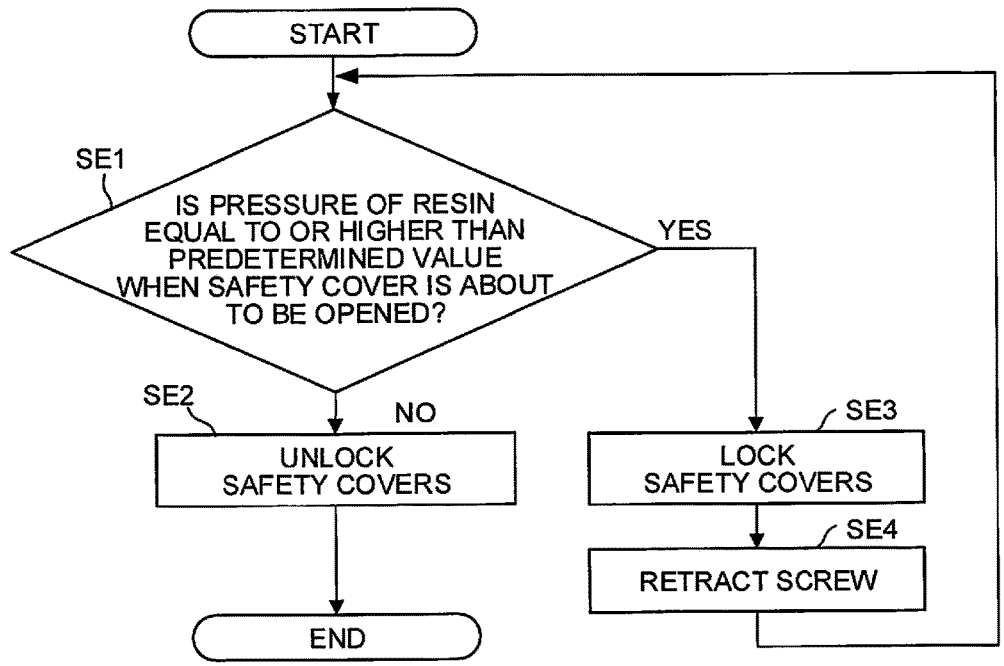
FIG. 8 is a flowchart illustrating an operation according to still another modification of the present invention.

FIG. 8 is a flowchart illustrating a flow of an operation according to still another modification of the present embodiment. The flow is described step by step below.

(Step SE1) Whether pressure inside the injection device is equal to or higher than a predetermined value when the safety cover is about to be opened is determined. When the pressure inside the injection device is equal to or higher than the predetermined value (YES), the process goes to step SE3. When the pressure inside the injection device is lower than the predetermined value (NO), the process goes to step SE2.

(Step SE2) The safety covers are unlocked and the process is ended.

(Step SE3) The safety covers are locked.

(Step SE4) The screw is retracted and the process returned to step SE1.

As a safety cover opening operation detection unit which detects an action of trying to open the safety cover by an operator, a switch or a sensor which is provided to a handle of the safety covers can be used. The detection unit can be configured such that the handle can be rotated when a force is applied to the handle by an operator and the detection unit detects the action of trying to open based on the rotary movement of the handle.

In the present modification, when an operator tries to open the safety cover in the case where the injection pressure inside the injection device is equal to or higher than a predetermined value, the screw is retracted so as to actively lower the pressure inside the cylinder. Accordingly, it is possible to render the operator safe in an early stage.

Here, in the embodiments and the modifications of the present invention, the injection pressure of the injection cylinder is detected by the injection pressure detector which is provided to the injection cylinder. As a method for detecting injection pressure, resin pressure inside the nozzle and the cylinder may be detected as described above or injection pressure may be detected by using a load cell or the like which is attached to a rear end of the screw. Further, as other detecting methods, thrust of the screw may be detected by using a load cell or the like, a current value of a motor which drives the screw may be detected so as to detect injection pressure, injection pressure may be detected based on hydraulic pressure of a hydraulic pressure cylinder which drives the screw, and resin pressure inside the mold may be detected.

The invention claimed is:

1. An injection molding machine, comprising:
a first injection device which includes
a safety cover having a plurality of doors each of which is openable and closable, and
a screw covered by the safety cover;
a second injection device which includes
a nozzle, and
a screw;
a mold into which a resin is to be injected from the first and second injection devices, the mold covered by the safety cover;
an injection pressure detection unit for which the second injection device is an object for detection, the injection pressure detection unit configured to detect injection pressure inside the object for detection;
a locking mechanism configured to prevent opening of the plurality of doors of the safety cover; and
a lock control unit configured to control the locking mechanism, wherein
a first door of the plurality of doors of the safety cover is opened to permit access by the nozzle of the second injection device to the mold,
a second door of the plurality of doors of the safety cover is disposed in a straight line extending through the nozzle in a direction in which the resin is injected from the nozzle into the mold, and
the lock control unit is configured to set the locking mechanism to a locked state so as to inhibit opening of the second door of the safety cover, in response to the injection pressure inside the object for detection, the injection pressure being detected by the injection pressure detection unit, being equal to or higher than a predetermined value.

2. The injection molding machine according to claim 1, further comprising:

a nozzle touch detection unit configured to detect a contact state of the nozzle with respect to the mold, wherein the lock control unit is configured to set the locking mechanism to the locked state so as to inhibit opening of the second door of the safety cover in response to both the nozzle touch detection unit detecting the contact state of the nozzle with respect to the mold, and the injection pressure inside the object for detection, the injection pressure being detected by the injection pressure detection unit, being equal to or higher than the predetermined value.

3. The injection molding machine according to claim 1, further comprising:

a danger notification unit configured to provide notification in response to the injection pressure inside the object for detection, the injection pressure being detected by the injection pressure detection unit, being equal to or higher than the predetermined value.

4. The injection molding machine according to claim 1, further comprising:

a safety cover opening operation detection unit configured to detect an action of trying to open the safety cover by an operator; and a screw retraction control unit configured to retract the screw provided inside the object for detection in response to the safety cover opening operation detection unit detecting the action of trying to open the safety cover, and the injection pressure inside the object for detection, the injection pressure being detected by the injection pressure detection unit, being equal to or higher than the predetermined value.

5. An injection molding machine, comprising:
a first injection device which includes
at least one safety cover which is openable and closable, and
a screw;
a second injection device which includes
a nozzle, and
a screw;
a mold into which a resin is to be injected from the first and second injection devices;
an injection pressure detection unit for which the second injection device is an object for detection, the injection pressure detection unit configured to detect injection pressure inside the object for detection;
a locking mechanism configured to prevent opening of the safety cover; and
a lock control unit configured to control the locking mechanism, wherein the safety cover is disposed in a straight line extending through the nozzle in a direction in which the resin is injected from the nozzle into the mold, and the safety cover is placed in the first injection device, and the lock control unit is configured to set the locking mechanism to a locked state so as to inhibit opening of the safety cover, in response to the injection pressure inside the object for detection, the injection pressure being detected by the injection pressure detection unit, being equal to or higher than a predetermined value, the injection molding machine further comprising:

a screw retraction control unit configured to retract the screw provided inside the object for detection in response to the injection pressure inside the object for detection, the injection pressure being detected by the injection pressure detection unit, being equal to or higher than the predetermined value at a point in time when a molding operation of the injection device is complete.

6. An injection molding machine, comprising:
a first injection device which includes at least one safety cover which is openable and closable and a screw;
a second injection device which includes a nozzle and a screw;
an injection pressure detection unit for which the second injection device is an object for detection and which detects injection pressure inside the object for detection;
a locking mechanism which prevents opening of the safety cover; and
a lock control unit which controls the locking mechanism; wherein the safety cover is disposed in a direction in which a resin is injected from the nozzle, and the lock control unit sets the locking mechanism to a locked state so as to inhibit opening of the safety cover in a case where injection pressure inside the object for detection, the injection pressure being detected by the injection pressure detection unit, is equal to or higher than a predetermined value, the injection molding machine further comprising:

a safety cover opening operation detection unit which detects an action of trying to open the safety cover by an operator; and a screw retraction control unit which retracts the screw that is provided inside the object for detection when the safety cover opening operation detection unit detects the action of trying to open the safety cover by an operator in the case where injection pressure inside the object for detection, the injection pressure being detected by the injection pressure detection unit, is equal to or higher than a predetermined value.

* * * * *